S. G. MILLER.
CATERPILLAR TRACTOR TRACK.
APPLICATION FILED JAN. 10, 1916.
1,249,166.
Patented Dec. 4, 1917.
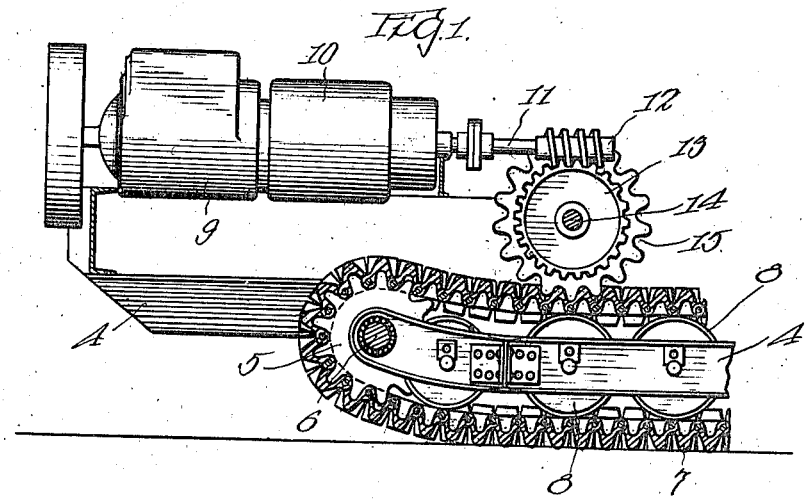
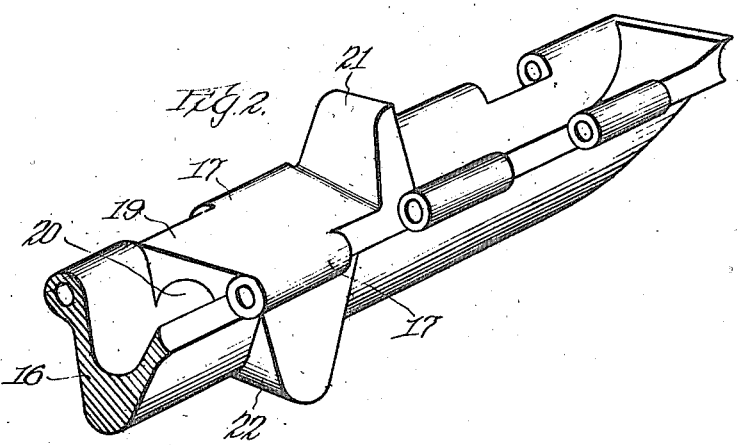
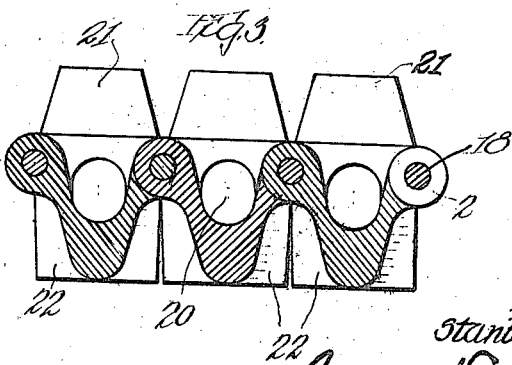
Inventor:
Stanley G. Miller

UNITED STATES PATENT OFFICE.

STANLEY GLOUINGER MILLER, OF ST. PAUL, MINNESOTA, ASSIGNOR, BY DIRECT AND MESNE ASSIGNMENTS, TO THE GENERAL MACHINERY & INVESTMENT COMPANY, OF ST. PAUL, MINNESOTA, A CORPORATION OF MINNESOTA.

CATERPILLAR-TRACTOR TRACK.

1,249,166.  Specification of Letters Patent.  Patented Dec. 4, 1917.

Application filed January 10, 1916. Serial No. 71,137.

*To all whom it may concern:*

Be it known that I, STANLEY G. MILLER, a citizen of the United States, residing at St. Paul, in the county of Ramsey and State of Minnesota, have invented certain new and useful Improvements in Caterpillar-Tractor Tracks, of which the following is a specification.

My invention relates to tracks adaptable for use on caterpillar tractors and the like and has for its object the provision of a simple and efficient track of the character mentioned which is adapted to run smoothly and in which there is little or no loss of motion. A further object is the provision of a track of the character mentioned which is constructed in a manner to provide teeth for meshing with gears on its inner and outer sides, by means of which it may be driven. Other objects will appear hereinafter.

An embodiment of my invention is shown in the accompanying drawing forming a part of this specification and in which,—

Figure 1 is a longitudinal fragmental view of a tractor equipped with a track embodying my invention.

Fig. 2 is an enlarged fragmental perspective view of one tread plate of the track; and, Fig. 3 is an enlarged longitudinal view of three tread plates of my improved track.

Referring more particularly to the drawing, I have shown the rear end portion of a caterpillar tractor in Fig. 1, this portion being sufficient to show the application of my improved track. In the portion of the tractor shown, a frame 4 of any preferred construction is provided with a gear wheel 5, mounted on a shaft 6, and the latter journaled in the frame 4 in any suitable manner. It is understood that another gear wheel similar to gear wheel 5 is used in the forward part of the tractor, the same not being shown here. Between the gear wheel 5 and the gear at the front end of the machine, which is not shown, there are a number of track wheels 8, which are adapted to rest on the track belt 7 and support the tractor. The track wheels 8 are preferably of sizes so that the top run of the track 7 rests on their tops. This provides means whereby the same track wheels 8 serve the double function of track wheels and idler for supporting the upper run of the track.

The frame construction 4, supports a motor 9, which is provided with a gear box 10, having a shaft 11 extending therefrom. The extended end of shaft 11 is provided with a worm 12, which meshes with a worm wheel 13, carried on a shaft 14, which is journaled in the frame 4. The shaft 14, also carries a plurality of gear wheels 15, one of which is shown, which are adapted to mesh with the outer and ground engaging side of the track belt 7, see Fig. 1. It is understood that the driving of the track belt 7 may be accomplished by using gear wheel 5 as a driving gear when so desired. With this arrangement, the track belt 7 may be driven from its inner side by gear 5 or on its outer side by gear 15.

The track belt 7 is made up of a plurality of tread plates 16, which are preferably V-shaped in cross section, as clearly indicated in the drawing. At the longitudinal edges of each tread plate are a plurality of spaced perforated ears 17. The ears 17 and the spaces between such ears, are so formed that the ears on one tread plate fit snugly in the spaces between the ears on the next adjacent tread plate, so that there is a substantially dirt tight joint between the tread plates. The perforated ears 17 are connected by means of rods 18 to form hinges for the tread plates. The tread plates are so formed that the outer or ground engaging side thereof, forms teeth which mesh in gear 15, while at the opposite or inner side of the track belt 7, two adjacent halves of adjacent tread plates, form a tooth for meshing with the gear 5, or a gear at the inner side of the track belt. The open side of each tread plate is bridged over for a short distance by means of a track portion 19, which is integral with the tread plate. There are as many track portions 19 as there are wheels 8 in a line across the frame. The number may vary from two to three in ordinary constructions. One track portion 19 only is shown. The track portions 19, are preferably bridged over, leaving an opening 20 between the bottom thereof and the bottom of the groove on the tread plate as clearly indicated in Figs. 2 and 3 to lighten the construction. However, this construction may be varied when so desired. On each tread plate 16, I provide guide lugs 21; there are preferably two guide lugs to each tread plate, which are adapted to engage the sides of wheels 8 to guide the track in proper position in the tractor. The guide lugs 21, may be formed in any suitable position on the tread plates, but, I prefer to form them integrally on the ends of the track portions 19, as clearly indicated in Fig. 2.

On the ground engaging side of the track 7, I provide lugs 22, which serve the double function for providing anti-skidding means for the tractor and preventing the tread plates from doubling together between the track wheels 8, when the track belt 7 passes over obstructions, which would tend to bend the track upwardly between the track wheels. The lugs 22, form shoulders, which prevent the tread plates from bending toward each other when the device passes over a small obstruction.

While I have illustrated and described the preferred form of my invention, I do not desire to be limited to the precise details set forth, but, desire to avail myself of such variations and changes as come within the scope of the appended claims.

I claim:

1. A caterpillar track comprising a plurality of elongated tread plates hinged together along their longitudinal edges forming an endless track, the outer and ground-engaging side of the track being provided with rack teeth by means of which the track is adapted to be driven.

2. A caterpillar tractor track comprising a plurality of tread plates hinged together along their longitudinal edges forming an endless track, the outer and ground-engaging side of the track having spaced ridge-like portions thereon providing rack teeth adapted to mesh with a driving gear for driving the track.

3. A caterpillar tractor track comprising a plurality of tread plates substantially V-shaped in cross section and pivotally connected together at their longitudinal edges providing rack teeth on the inner and outer sides of the track.

4. A caterpillar tractor track comprising a plurality of tread plates substantially V-shaped in cross section and pivotally connected together at their longitudinal edges providing rack teeth on the inner and outer sides of the track, each tread plate forming one rack tooth at one side of the track and the two adjacent halves of each adjacent pair of tread plates forming a rack tooth at the other side of the track.

5. A caterpillar tractor track comprising a plurality of tread plates disposed in edge to edge relation; perforated ears disposed along the adjacent edges of the tread plates from side to side of the track, the ears on one tread plate extending between and substantially filling the spaces between the ears on the next adjacent tread plate; rods extending through said ears pivotally connecting the tread plates together; and rack teeth on the outer and ground-engaging side of the track providing means by which the track may be driven.

6. A caterpillar tractor track comprising a plurality of tread plates substantially V-shaped in cross section; hinges pivotally connecting the longitudinal edges of said tread plates; and lugs on the tread plates limiting the pivotal movement of said tread plates.

7. A caterpillar tractor track comprising a plurality of tread plates substantially V-shaped in cross section; and guiding lugs on the tread plates adapted to guide the track in use.

8. An endless caterpillar tractor track comprising a plurality of tread plates disposed in edge to edge relation, the inner side of the track having parallel grooves therein extending substantially from side to side of the track providing rack teeth on the inner side of the track; hinges connecting the adjacent edges of the tread plates; bridges extending across said grooves providing substantially plane wheel-engaging surfaces which extend from one edge to the other of said grooves; and means on the outer or ground-engaging side of the track for driving the latter.

9. A caterpillar tractor track comprising a plurality of tread plates substantially V-shaped in cross section and pivotally connected together at their longitudinal edges; and a short integral bridge across the open side of each tread plate providing a rail portion for the track on said tread plate.

10. A caterpillar tractor track comprising a plurality of tread plates connected together in an endless track belt formation, the outer and inner surfaces of the track being corrugated with the corrugation ridges extending laterally of the track substantially from one edge to the other thereof providing driving rack teeth on the inner and outer sides of the track.

In testimony whereof I have signed my name to this specification, in the presence of two subscribing witnesses, on this 5th day of January, A. D. 1916.

STANLEY GLOUINGER MILLER.

Witnesses:
STANLEY F. MILLER,
ALEX C. NICHOLSON.